(12) United States Patent
Sugiyama et al.

(10) Patent No.: US 8,125,602 B2
(45) Date of Patent: Feb. 28, 2012

(54) LIQUID CRYSTAL DISPLAY PANEL, ELECTRONIC APPARATUS EQUIPPED WITH THE SAME, AND METHOD FOR MANUFACTURING LIQUID CRYSTAL DISPLAY PANEL

(75) Inventors: Hiroki Sugiyama, Tottori (JP); Tomoyuki Nakano, Tottori (JP); Keiji Takizawa, Azumino (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 12/190,320

(22) Filed: Aug. 12, 2008

(65) Prior Publication Data
US 2009/0051859 A1    Feb. 26, 2009

(30) Foreign Application Priority Data

Aug. 22, 2007 (JP) .................................. 2007-215609
May 30, 2008 (JP) .................................. 2008-142234

(51) Int. Cl.
*G02F 1/1333* (2006.01)

(52) U.S. Cl. ......... 349/138; 349/106; 349/114; 349/153

(58) Field of Classification Search .................. 349/114, 349/106, 138, 110, 153; 445/25
See application file for complete search history.

(56) References Cited

U.S. PATENT DOCUMENTS

| 6,859,254 B2 * | 2/2005 | Kim et al. ..................... 349/190 |
| 2003/0030767 A1 * | 2/2003 | Takizawa et al. ............. 349/113 |

FOREIGN PATENT DOCUMENTS

| JP | A-11-64837 | 3/1999 |
| JP | A-2001-147439 | 5/2001 |

* cited by examiner

*Primary Examiner* — Thoi Duong
(74) *Attorney, Agent, or Firm* — K&L Gates LLP (57) ABSTRACT

There is provided a liquid crystal display panel that includes an array substrate having at least a pixel electrode and a switching element for every pixel area in a display area on a transparent substrate, a color filter substrate in which a light shielding layer made of a resin is formed on a transparent substrate at least outside the display area and a color filter layer is formed to oppose the pixel electrode, and liquid crystal enclosed between the array substrate and the color filter substrate that are bonded by a seal material. A protection film having an opening, the opening being opened in the display area, is formed on the color filter substrate in the outside of the display area to cover at least the portion of the light shielding layer on which the seal material is formed.

10 Claims, 12 Drawing Sheets

LIQUID CRYSTAL DISPLAY PANEL, ELECTRONIC APPARATUS EQUIPPED WITH THE SAME, AND METHOD FOR MANUFACTURING LIQUID CRYSTAL DISPLAY PANEL

BACKGROUND

1. Technical Field

The present invention relates to a liquid crystal display panel of a transmissive or a semi-transmissive type having a light shielding layer made of a resin, an electronic apparatus equipped with the same, and a method for manufacturing the liquid crystal display panel.

2. Related Art

In recent years, application of a liquid crystal display device has been rapidly spread not only to an information communication device, but also to a general electrical equipment. In general, an array substrate and a color filter substrate are oppositely disposed, the peripheries thereof are bonded together by a seal material, and liquid crystal is enclosed between the both substrates to form the liquid crystal device. The array substrate is the one having a plurality of pixel electrodes provided on a first transparent substrate in a matrix manner. The color filter substrate is the one having a light shielding layer formed on a second transparent substrate in a matrix manner, a plurality of color filter layers provided to oppose each of the pixel electrodes, and a common electrode made of a transparent electrode such as ITO (Indium Tin Oxide) or IZO (Indium Tin Oxide), or the like formed on the color filter layer.

A metal material such as chrome or the like is often used in the light shielding layer formed on the color filter substrate among the liquid crystal display panel having the structure. The reason that a metal is used in this manner is that it is advantageous in the point that thin film property and high light shielding property can be obtained.

However, in recent years, a light shielding layer made of a resin material instead of the metal material has been appeared. The light shielding layer made of a resin material is cheaper than the metal material. Further, the reflectance ratio of the resin material is lower than the metal material, so that it is easy to provide high contrast. Further, influence to environment is also small. In this manner, using the resin material has the advantages than using the metal material.

Incidentally, when the light shielding layer made of a resin is used, a seal material for bonding the array substrate and the color filter substrate together is bonded on, for example, the light shielding layer. However, the light shielding layer made of a resin has low adhesiveness with the seal material as compared with the light shielding layer made of a metal material. Accordingly, there is a case that detachment phenomenon occurs at a boundary face with the seal material. Specifically, for example, it is considered that the light shielding layer made of a resin includes a black pigment so that adhesiveness between the pigment and the seal material is low.

As for a method for solving such a problem, a liquid crystal display panel in which a surface of the light shielding layer made of a resin formed in a display area and a non display area is covered by a protection film is disclosed in JP-A-11-64837 (hereinafter, referred to as Patent Document 1) and JP-A-2001-147439 (hereinafter, referred to as Patent Document 2).

As is disclosed in Patent Documents 1, 2, the problem described above can be solved if the light shielding layer made of a resin is covered by a protection film. However, when the surface of the light shielding layer is solidly covered by the protection film, each pixel area in a display area is to be also covered by the protection film. If the pixel area is covered by the protection film in this manner, there occurs a problem in that the transmittance ratio in the pixel area is lowered and a screen is displayed with a tinge of yellow.

Further, the case will be describe in which the structure in which the aforementioned light shielding layer made of a resin is used and the upper portion of the light shielding layer is further covered by the protection film is employed in a semi-transmissive liquid crystal display panel. A transparent film for adjusting a cell gap is formed at a reflective portion of a pixel area in the semi-transmissive liquid crystal display panel. Accordingly, the protection film is formed and the transparent film for adjusting a cell gap is formed in the reflective portion. Herewith, the transmittance ratio of the semi-transmissive liquid crystal display panel is further lowered.

Further, when the semi-transmissive liquid crystal display panel equipped with the light shielding layer made of a resin is manufactured, the process for forming the protection film and the process for forming the transparent film for adjusting a cell gap are required. In this case, there is a problem in that the number of manufacturing processes is increased as compared with the conventional semi-transmissive liquid crystal display panel equipped with the light shielding layer made of a metal.

SUMMARY

Application Example 1

According to an aspect of the invention, there is provided a liquid crystal display panel including an array substrate having at least a pixel electrode and a switching element for every pixel area in a display area on a transparent substrate, a color filter substrate in which a light shielding layer made of a resin is formed on a transparent substrate at least outside the display area and a color filter layer is formed to oppose the pixel electrode, and liquid crystal enclosed between the array substrate and the color filter substrate that are bonded by a seal material. A protection film having an opening, the opening being opened in the display area, is formed on the color filter substrate in the outside of the display area to cover at least the portion of the light shielding layer on which the seal material is formed.

According to the structure, since the light shielding layer made of a resin is covered by the protection film in the outside of the display area on which the seal material is formed, separation phenomenon occurred between the light shielding layer and the seal material can be prevented. In addition, since the protection film has an opening and no protection film is formed in the display area, it becomes possible that the transmittance ratio is lowered and to become yellowish is reduced. Consequently, a liquid crystal display panel that provides bright display quality can be obtained.

Application Example 2

It is preferable that the protection film is formed to surround the display area in the liquid crystal display panel according to the above application example.

According to the structure, since the protection film is formed to surround the display area, adhesiveness between the array substrate and the color filter substrate can be assured when the seal material is disposed to surround the display area.

Application Example 3

It is preferable that the pixel area has a transmissive portion and a reflective portion, and the protection film is a transparent resin and the opening is formed at a position corresponding to the transmissive portion in the liquid crystal display panel according to the above application examples.

According to the structure, since the adhesiveness with the seal material is improved by the protection film, separation phenomenon can be efficiently restrained also in a semi-transmissive liquid crystal display panel. Further, since the protection film made of a transparent resin is formed in the reflective portion outside the transmissive portion, the protection film can be used also as a transparent film for adjusting a cell gap used in a semi-transmissive liquid crystal display panel.

Application Example 4

It is preferable that the opening is formed to stride across the adjacent transmissive portions in the liquid crystal display panel according to the above application example.

According to the structure, the protection film is formed in a slit shape. Accordingly, when the protection film is formed by a known photolithography method, it is not necessary to prepare a mask having a pattern that corresponds to the transmittance portion for every pixel area. Accordingly, a pattern of a mask to be used can be simplified.

Application Example 5

It is preferable that if a distance between a surface of the arrays substrate and a surface of the color filter substrate in the transmissive portion is Ha, and if a distance between a surface of the arrays substrate and a surface of the color filter substrate in the reflective portion is Hb, a thickness of the protection film is set to satisfy a relation described below in the liquid crystal display panel according to the above application examples. Note that the "surface" of each of the array substrate and the color filter substrate denotes the most upper surface of the substrate on which various wirings and a film are formed.

$$Hb = \tfrac{1}{2} Ha$$

According to the structure, a difference of display image quality occurred between the reflective portion and the transmissive portion can be restrained by setting the distance between the both substrates in the reflective portion so as to be one-half of the distance between the both substrates in the transmissive portion by adjusting the thickness of the protection film. Accordingly, a liquid crystal display panel that provides good display image quality can be obtained.

Application Example 6

According to another aspect of the invention, there is provided an electronic apparatus including the liquid crystal display panel described above.

According to the structure, an electronic apparatus equipped with a liquid crystal display panel that provides a bright display quality can be provided.

Application Example 7

According to a still another aspect of the invention, there is provided a method for manufacturing a liquid crystal display panel that includes an array substrate in which a pixel electrode and a switching element are formed for every pixel area in a display area on a transparent substrate, and a color filter substrate in which a light shielding layer made of a resin is formed on a transparent substrate and a color filter layer is formed to oppose the pixel electrode, and in which the array substrate and the color filter substrate are bonded together by a seal material and liquid crystal is enclosed between the array substrate and the color filter substrate. The method for manufacturing a liquid crystal display panel includes forming the light shielding layer made of a resin on the color filter substrate to separate the pixel area, forming the color filter layer on the color filter substrate for every the pixel area, forming a protection film, the portion of the protection film corresponding to the display area being opened, on the color filter substrate on which the light shielding layer made of a resin and the color filter substrate are formed, and applying the seal material outside the display area and bonding the array substrate and the color filter substrate together.

According to the method, since the light shielding layer made of a resin is covered by the protection film in the outside of the display area on which the seal material is formed, separation phenomenon occurred between the light shielding layer and the seal material can be prevented. In addition, since the protection film has an opening and no protection film is formed in the display area, it becomes possible that the transmittance ratio is lowered and to become yellowish is reduced. Consequently, a liquid crystal display panel that provides bright display quality can be manufactured.

Application Example 8

It is preferable that the pixel area has a transmissive area and a reflective area, the protection film is made of a transparent resin, and when forming the protection film, the protection film is formed so that a portion correspond to the transmissive portion is opened, and if a distance between a surface of the arrays substrate and a surface of the color filter substrate in the transmissive portion is Ha and if a distance between a surface of the array substrate and a surface of the color filter substrate in the reflective portion is Hb, a thickness of the protection film is set to satisfy a relation described below. Note that the "surface" of each of the array substrate and the color filter substrate denotes the most upper surface of the substrate on which various wirings and a film are formed.

$$Hb = \tfrac{1}{2} Ha.$$

According to the method, the protection film can be also used as a transparent film for adjusting a cell gap. Accordingly, the productivity can be improved. Further, a difference of display image quality occurred between the reflective portion and the transmissive portion can be restrained by setting the distance between the both substrates in the reflective portion so as to be one-half of the distance between the both substrates in the transmissive portion by adjusting the thickness of the protection film. Accordingly, a liquid crystal display panel that provides good display image quality can be manufactured.

BRIEF DESCRIPTION OF THE DRAWINGS

The invention will be described with reference to the accompanying drawings, wherein like numbers reference like elements.

FIGS. 12A and 12B are each a diagram showing an electronic apparatus equipped with the liquid crystal display panel and FIG. 12A is a diagram showing a personal computer in which the liquid crystal display panel is mounted.

DESCRIPTION OF EXEMPLARY EMBODIMENTS

Hereinafter, the best embodiment of the invention will be described with reference to the accompanying drawings. The embodiment described below exemplifies a liquid crystal display panel that embodies the technical idea of the invention. Accordingly, the invention is not limited to the liquid crystal display panel and the invention can be also applied to another embodiment included in the scope of the Claims.

First Embodiment

Figure 1:
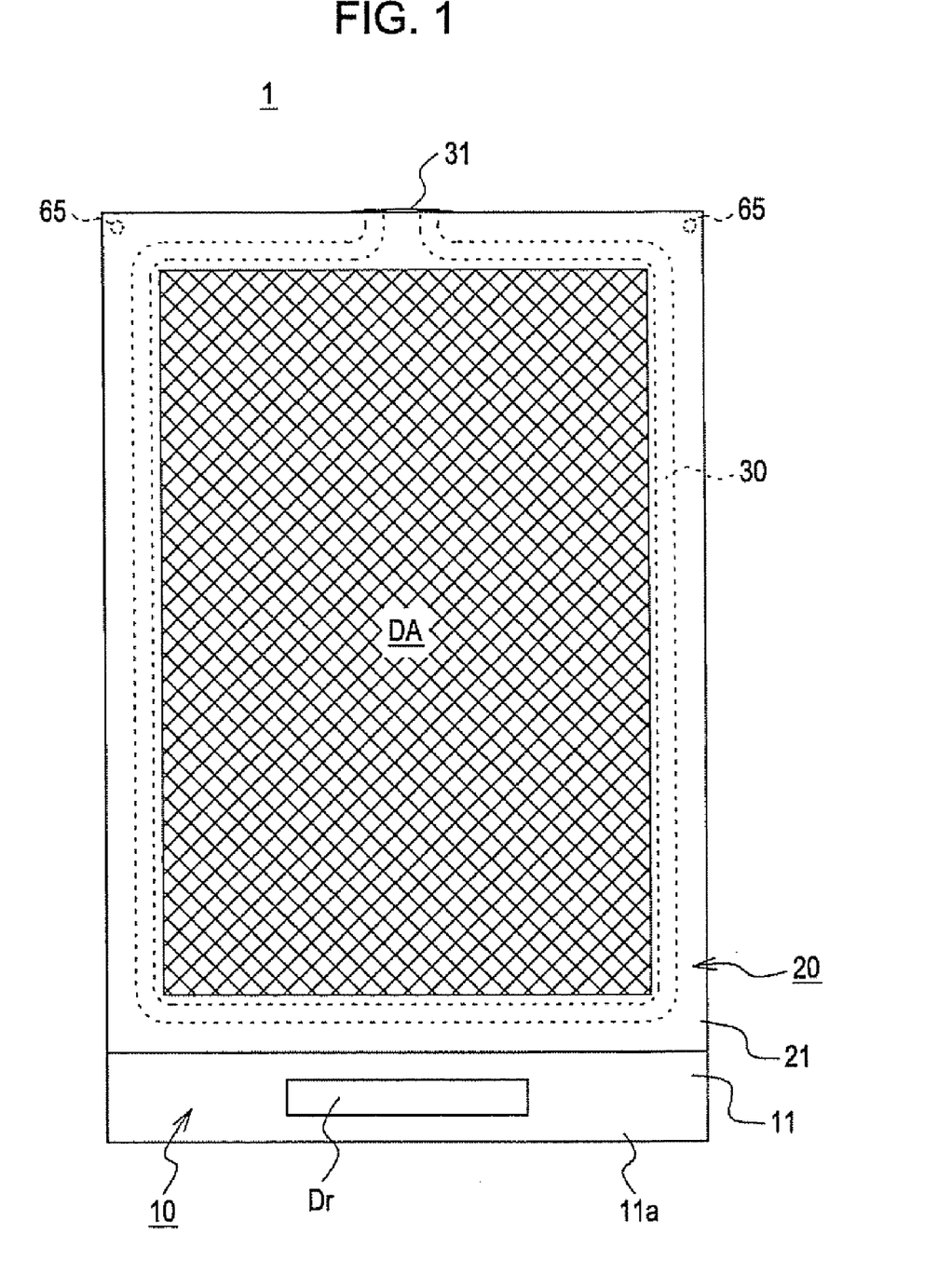
FIG. 1 a plan view showing a liquid crystal display panel according to a first embodiment.
Figure 2:
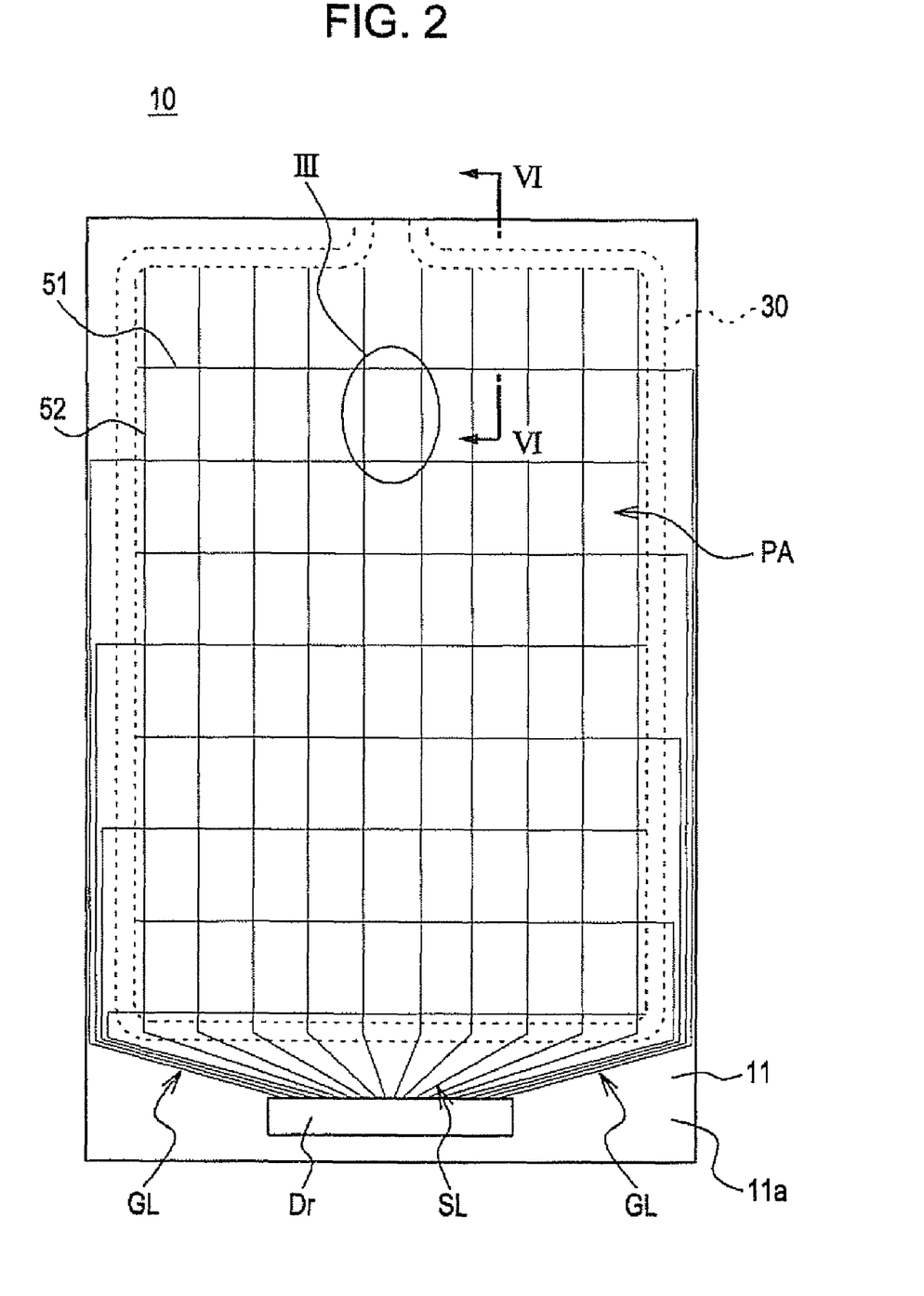
FIG. 2 is a schematic plan view showing a state of a surface of an array substrate of FIG. 1.
Figure 3:
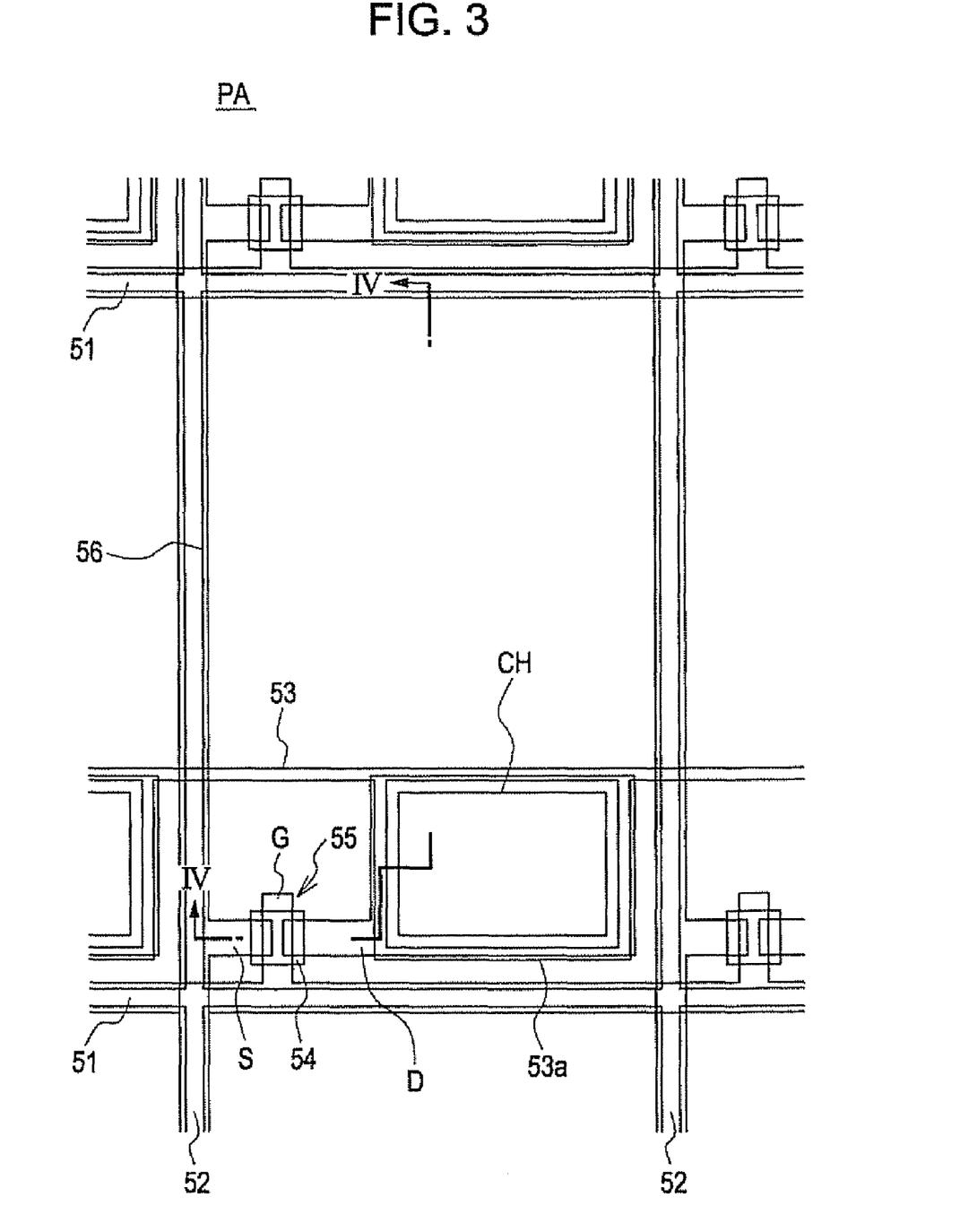
FIG. 3 is an enlarged plan view showing the portion III in FIG. 2 for illustrating a wiring structure in one pixel area.
Figure 4:
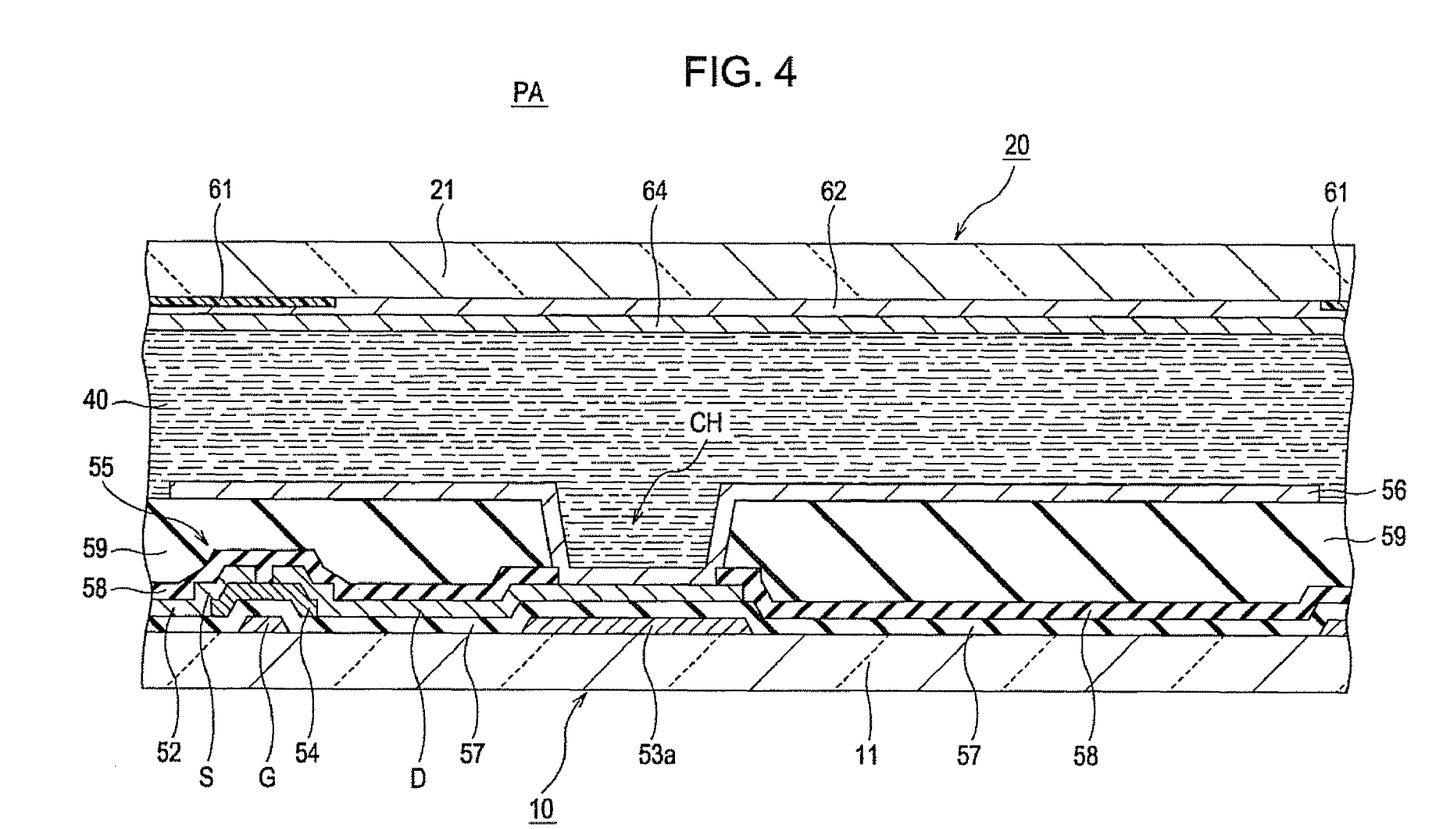
FIG. 4 is a main part cross sectional view taken along the line IV-IV of FIG. 3.
Figure 5:
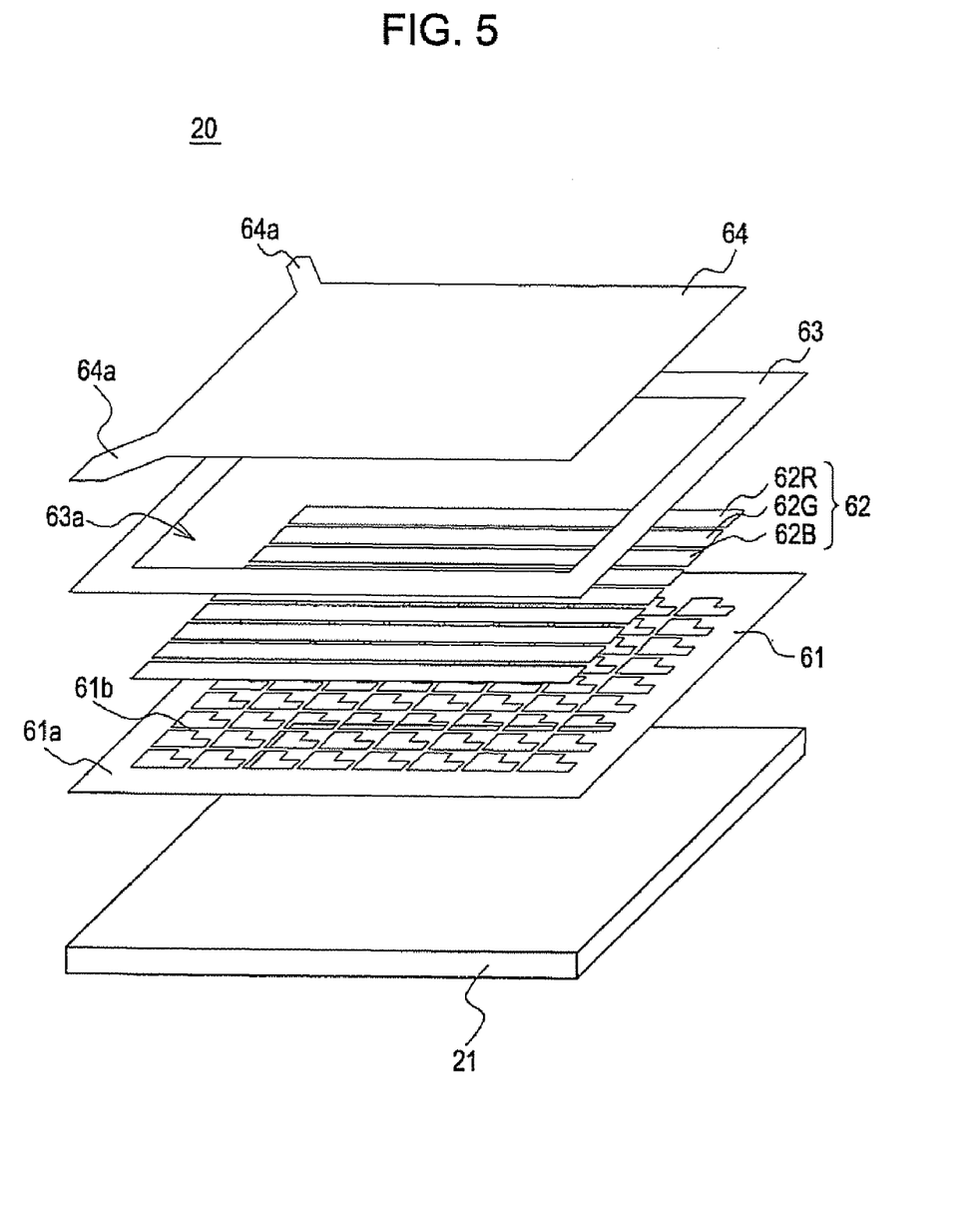
FIG. 5 is an exploded perspective view schematically showing a color filter substrate of the liquid crystal display panel shown in FIG. 1.
Figure 6:
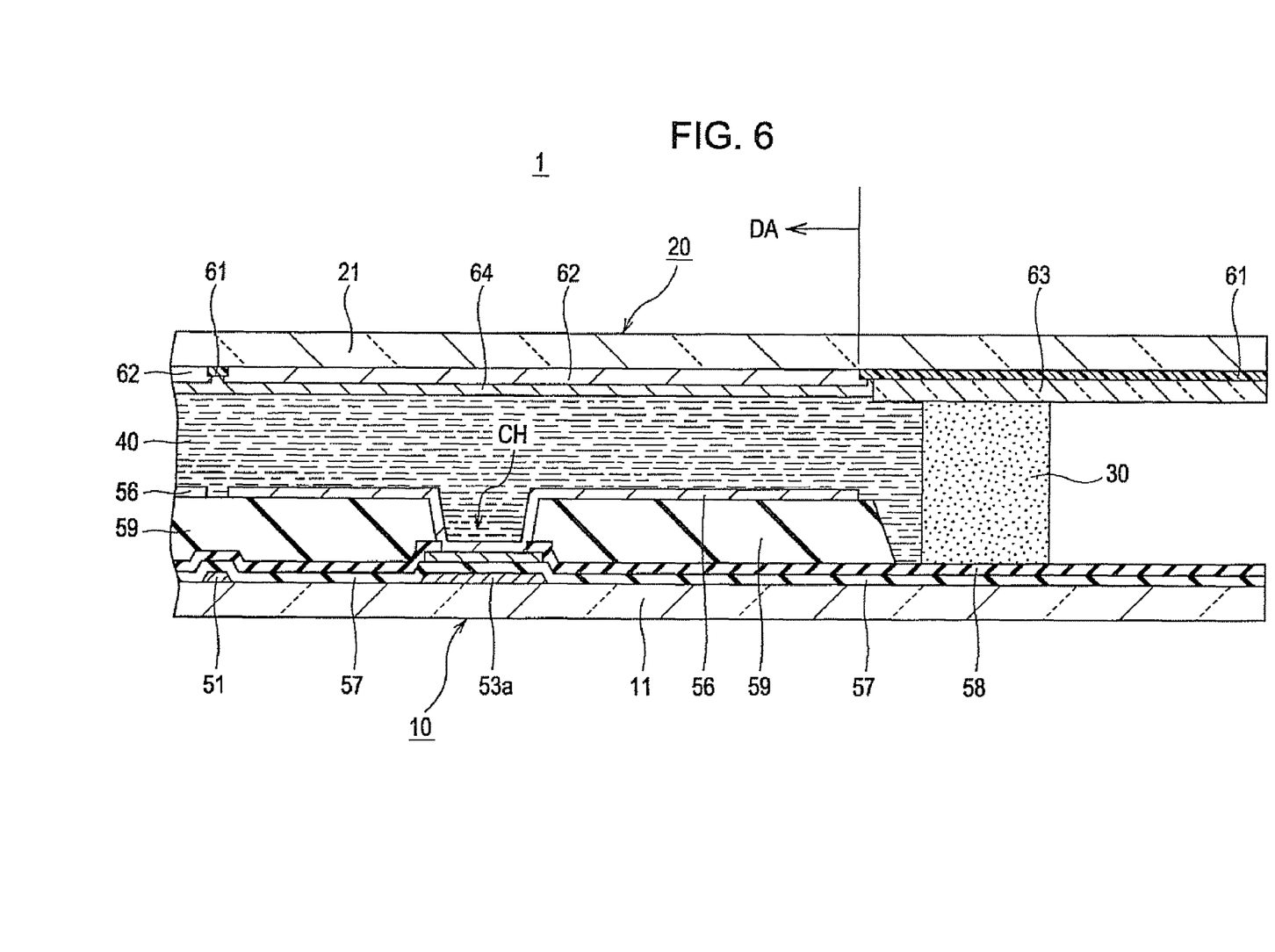
FIG. 6 is a main part cross sectional view showing the liquid crystal display panel of FIG. 1 taken along the line VI-VI of FIG. 2.

FIG. 1 is a plan view showing a liquid display panel according to a first embodiment. FIG. 2 is a schematic plan view showing a state of a surface of an array substrate of FIG. 1. FIG. 3 is an enlarged plan view showing the portion III in FIG. 2 for illustrating a wiring structure in one pixel area. FIG. 4 is a main part cross sectional view taken along the line IV-IV of FIG. 3. FIG. 5 is an exploded perspective view schematically showing a color filter substrate of the liquid crystal display panel shown in FIG. 1. FIG. 6 is a main part cross sectional view showing the liquid crystal display panel of FIG. 1 taken along the line VI-VI of FIG. 2.

The scales of each layer and each member are different so that each layer and each member can be recognized in each drawing used for illustrating the specification. Accordingly, the size in the drawing is not necessarily proportional to the size in reality.

An liquid crystal display panel 1 according to the first embodiment is a liquid crystal display panel of so called a COG (Chip On Grass) type that is constituted by an array substrate 10, a color filter substrate 20, a seal material 30 for bonding the both substrates 10, 20 together, and liquid crystal 40 (see FIG. 4) that is enclosed in the area surrounded by the array substrate 10, the color filter substrate 20, and the seal material 30 as shown in FIG. 1. In the liquid crystal display panel 1, a display area DA is provided inside the area surrounded by the seal material 30. The display area DA is an area in which liquid crystal molecules of the liquid crystal 40 are controlled based on an image signal transmitted from an outside. The outside area of the display area DA, that is, the area of a frame portion of the liquid crystal display panel 1 including the area in which the seal material 30 is applied becomes the outside of the display area DA that will be described below. Various wirings, a mark for positioning, and the like are formed in the area of the frame portion. Note that a lattice-shaped hatching is drawn in the area corresponding to the display area DA in FIG. 1.

As shown in FIG. 2, the array substrate 10 is the one in which various wirings for driving liquid crystal and the like are formed in the display area DA which is formed on a rectangular glass substrate 11 that is a first transparent substrate. The length of the array substrate 10 is longer than that of the color filter substrate 20 in the longitudinal direction. Then, the array substrate 10 is equipped with an extended portion 11a that is outwardly extended when the both substrates 10 and 20 are bonded together. A driver Dr formed by an IC chip, an LSI, or the like for outputting a driving signal is provided on the extended portion 11a.

As shown in FIG. 2, a plurality of scanning lines 51 and a plurality of signal lines 52 are formed in a matrix manner in the display area DA of the array substrate 10. The plurality of scanning lines 51 and the plurality of signal lines 52 are extended outside the display area DA. Further, the plurality of scanning lines 51 are connected to a plurality of gate drawing lines GL and the plurality of signal lines 52 are connected to a plurality of source drawing liens SL respectively. Further, the gate drawing lines GL and the source drawing lines SL are drawn in the outside of the display area DA and one ends thereof are connected to the river Dr.

Further, as shown in FIG. 3, a plurality of auxiliary capacity lines 53 are provided between the adjacent scanning lines 51 in parallel to the scanning lines 51 in the display area DA of the array substrate 10 in addition to the plurality of scanning lines 51 and the plurality of signal lines 52. Further a thin film transistor (TFT) 55 formed by a source electrode S, a gate electrode G, a drain electrode D, and a semiconductor layer 54 is provided as a switching element. Further a pixel electrode 56 that covers the area surrounded by the scanning lines 51 and the signal lines 52 is provided. Note that as for the semiconductor layer 54 for the TFT 55, poly silicon (p-Si) or amorphous silicon (a-Si) is generally used. Further, the switching element is not limited to the TFT 55 and another element may be employed. Further, in the embodiment, the area surrounded the plurality of scanning lines 51 and the plurality of signal lines 52 shall be one pixel area PA.

Next, a manufacturing process of the various wirings and the like formed on the array substrate 10 will be simply described mainly with reference to FIG. 2 and FIG. 3.

First, a film made of an electro conductive material made of aluminum, molybdenum, chrome, titanium, or an alloy thereof having a predetermined thickness is formed on the glass substrate 11. Note that the film may be made of another material except the aforementioned materials. Then, the film is patterned by using a well known photolithography method. By the process, the scanning line 51 that extends in the horizontal direction, the auxiliary capacity line 53 positioned between the adjacent scanning lines 51, the gate electrode G that extends from the scanning line 51, an auxiliary capacity electrode 53a formed by widening a portion of the auxiliary capacity line 53, the gate drawing line GL, and a common drawing line (not shown) are formed.

Next, a gate insulating film 57 (see FIG. 4) having a predetermined thickness is formed to cover the glass substrate 11 on which the scanning line 51, the auxiliary capacity line 53, and the like are formed by the aforementioned process. A transparent inorganic insulating material made of silicon nitride, oxide silicon, or the like is used as the gate insulating film 57.

Next, a semiconductor layer made of, for example, a-Si is formed on the gate insulating layer 57. Then, the a-Si layer is removed by etching so that the portion covering the gage electrode G is leaved. Then, a semiconductor layer 54 that becomes a part of the TFT 55 is formed. Herewith, a film made of a conductive material is formed on the glass substrate 11 on which the plurality of layers are formed, and the signal line 52 that extends in the direction perpendicular to the scanning line 51, the soured electrode S extended from the signal line 52 and connected to the semiconductor layer 54, the drain electrode D that covers above the auxiliary capacity electrode 53a and is connected to the semiconductor layer 54 at one end, and the source drawing line SL are patterned. By the process, the TFT 55 is formed at the vicinity of the crossing portion of the scanning line 51 and the signal line 52 on the glass substrate 11.

Further, a passivation film 58 (see FIG. 4) made of an inorganic insulating material that covers the various wirings for stabilizing the surface of various wiring is formed. Then, an interlayer film 59 (see FIG. 4) made of an organic insulating material for flattening the surface of the allay substrate 10 is formed. Note that a contact hole CH for electrically connecting the pixel electrode 56 described below and the drain electrode D is provided in the interlayer film 59 and the passivation film 58. Then, a pixel electrode 56 made of, for example, ITO (Indium Tin Oxide) or IZO (Indium Zinc Oxide) is formed for every one pixel area PA surrounded by the scanning lines 51 and the signal lines 52. When forming, the pixel electrode 56 is preferably provided so that the outer edge thereof is positioned above the scanning lines 51 and the signal lines 52 and the adjacent pixel electrodes 56 does not made contact with each other. The array substrate 10 is manufactured by the aforementioned processes.

As shown in FIG. 5, a resin light shielding layer 61 made of a resin material formed to match the border of the pixel area PA of the array substrate 10 is formed on a glass substrate 21 which becomes a second transparent substrate in the color filter substrate 20. The resin light shielding layer 61 is made of a resin, for example, including a pigment of a black colorant. Further color filter layers 62 (62R, 62G, 62B) of red (R), green (G), blue (B), and the like are provided in the area surrounded by the resin light shielding layer 61. Further, a protection film 63 is provided to cover the outer circumference of the resin light shielding layer 61. Further, a common electrode 64 is formed to cover the color filter layers 62. However, the structure of the color filter substrate 20 is not limited to this and there is a case that no color filter layer exists in the case of black and white display, and there is a case that the color filter layers are constituted by not the three primary colors but may be constituted by not less than three types of color filter layers in the case of color display of a color supplemental type.

The resin light shielding layer 61 provided on the color filter substrate 20 is formed by using a known photolithography method or the like. The resin light shielding layer 61 is constituted by a frame portion 61a that covers the entire outer circumference of the display area DA and a grid portion 61b that is positioned inside the frame portion 61a, that is, in the display area DA, and is formed in a grid manner so as to oppose the scanning lines 51 and the signal lines 52 on the array substrate 10. Further, the vicinity of the crossing portion of the grid portion 61b of the resin light shielding layer 61 is expanded to cover the TFT 55 of the array substrate 10. This is because to prevent the current leakage generated when outside light is introduced into the semiconductor layer 54 of the TFT 55. Note that the shape of the resin light shielding layer 61 is not necessary limited to the aforementioned grid shape and, for example, may be a stripe shape or the shape to cover only the TFT 55.

The frame portion 61a of the resin light shielding layer 61 covers the entire outer circumference of the display area DA. However, a part of the resin light shielding layer 61 around the end of the color filter substrate 20 may be omitted as a mark for cutting the substrate. The frame portion 61a of the resin light shielding layer 61 is provided around the outer circumference of the display area DA to prevent optical leakage from a back light. However, a part of the resin light shielding layer 61 may be trimmed as the aforementioned mark for cutting the substrate or a mark for positioning in the area which is not influenced by optical leakage from the back light.

Further, the color filter layer 62 provided on the grid portion 61b of the resin light shielding layer 61 is formed in a stripe arrangement in which the same color filter layer 62 is provided in one direction in series with respect to the plurality of openings formed in the grid portion 61b. Note that two color filter layers adjacent to one color filter layer (for example, a color filter layer 62G of G color) are provided so that the colors thereof are different from the color of the one color filter layer (for example, color filter layers 62R, 62B of R color and B color).

Then, the protection film 63 is formed after the resin light shielding layer 61 and the color filter layer 62 are formed. The protection film 63 is formed by a material which has high adhesiveness with the seal material 30. As for the protection film 63, an acrylate resin, an epoxide resin, or the like is employed. As for the seal material 30, a thermoset epoxy type resin, a modified epoxy type resin of an ultraviolet cure type, an acrylic type resin, or the like is employed. The materials have high adhesiveness with the material of the protection film 63. Further, since the protection film 63 is made of a transparent resin and no pigment is included, the adhesiveness with the seal material 30 becomes high as compared with the resin light shielding layer 61 that includes a pigment.

Further, the protection film 63 is formed in a frame manner to cover the frame portion 61a of the resin light shielding layer 61, and an opening 63a whose shape is approximately the same as the display area DA is formed at the position corresponding to the inside of the display area DA. Since the protection film 63 is provided to improve adhesiveness between the resin light shielding layer 61 and the seal material 30, it is necessary to provide the protection film 63 only at the bond portion with the seal material 30 in the frame portion 61a.

However, when the protection film 63 is provided only the bond portion with the seal material 30, the resin light shielding layer 61 is covered by the common electrode 64 in the display area DA, so that the light shielding layer 61 does not directly make contact with the liquid crystal 40. However, the resin light shielding layer 61 and the liquid crystal 40 are to be directly made contact between the position at which the seal material 30 is provided and the display area DA in the frame portion 61a. In this case, there is a fear that an ion component is melt from the resin light shielding layer 61 and dispersed into the liquid crystal 40, thereby causing display unevenness.

Accordingly, the protection layer 63 is provided to cover the entire of the frame portion 61a in the embodiment. Alternatively, the surface of the resin light shielding layer 61 may be covered by the common electrode 64 also in the frame portion 61a. However, it is known that a transparent conductive material such as an ITO which becomes a material of the common electrode 64 have low adhesiveness with the seal material 30. Accordingly, the structure is employed in which the common electrode 64 and the seal material 30 are not adhered except extended portions 64a to be described below.

In FIG. 6 the resin light shielding layer 61 is covered by the common electrode 64 at the border between the display area DA and the resin light shielding layer 61. Note that the resin light shielding layer 61 may be covered by the protection film 63 so as to overlap with the common electrode 64. Further, the shape of the opening 63a of the protection film 63 formed in the display area DA is not limited to approximately the same shape as the display area DA as shown in FIG. 5. For example, a plurality of openings may be formed by leaving the protection film 63 so as to match the shape of the resin light shielding layer 61 formed in the display area DA.

The common electrode 64 made of a transparent conductive material such as ITO, IZO, or the like is provided on the substrate on which the protection film 63 is formed to cover the display area DA. Further, at least at one portion (two portions in FIG. 1 and FIG. 5) of each corner of the common electrode 64 is to be the extended portion 64a that is extended to the outside of the display area DA. The extended portion 64a is connected to the common drawing line not shown on the array substrate 10 via a contact material 65 (see FIG. 1) and is to be electrically connected to the driver Dr.

The seal material 30 is the one for bonding the outer circumferences of both of the array substrate 10 and the color filter substrate 20 together. To be more specific, the seal material 30 is applied along the outer edge of the display area DA of the array substrate 10 and portions thereof are extended towered the side end of the array substrate 10 to form a liquid crystal injection opening 31 (see FIG. 1). Note that the position at which the liquid crystal injection opening 31 is formed is approximately the center of the short side opposing the short side at which the driver Dr of the array substrate 10 is formed in FIG. 1. However, the liquid crystal injection opening 31 may be provided at another potion. For example, the liquid crystal injection opening 31 may be provided at a corner or the like of any one of long sides of the array substrate 10.

Next, a structure around the area in which the seal material 30 is applied of the liquid crystal display panel 1 equipped with the aforementioned structure will be described specifically with reference to FIG. 6.

A columnar spacer (omitted in FIG. 6) is provided in the display area DA on any one of the substrates (for example color filter substrate 20) in the state where the array substrate 10 and the color filter substrate 20 are disposed so that the surfaces are opposed to each other. Further, the seal material 30 is applied on one of the array substrate 10 and the color filter substrate 20 along the outer circumference of the display area DA. Then, the array substrate 10 and the color filter substrate 20 are bonded together with the seal material 30. Then, the liquid crystal 40 is injected from the liquid crystal injection opening 31 and the liquid crystal injection opening 31 is enclosed by a sealing material (not shown). Herewith, the liquid crystal display panel 1 is assembled.

The seal material 30 is provided in a frame manner so as to surround the outer circumference of the display area DA in the liquid crystal display panel 1 assembled in this manner. When the seal material 30 is provided, the seal material 30 is bonded with the passivation film 58 at an end of the array substrate 10 side, and is bonded with the protection film 63 at an end of the color filter substrate 20 side. In this manner, as the end of the seal material 30 at the color filter substrate 20 side is bonded with the protection film 63 instead of the resin light shielding layer 61, the protection film 63 having high adhesiveness as compared with the resin light shielding layer 61 and the seal material 30 are strongly bonded. Accordingly, occurrence of separation phenomenon at the portion can be prevented.

Further, since the protection film 63 covers only the frame portion 61a of the resin light shielding layer 61 as described above, display quality is not influenced by the protection film 63.

Second Embodiment

The liquid crystal display panel 1 shown in the embodiment 1 is so called a transmissive liquid crystal display panel. However, the invention can be also applied to a semi transmissive liquid crystal display panel. Consequently, a semi transmissive liquid crystal display panel employing a resin light shielding layer will be described with reference to FIGS. 7 to 11 as a second embodiment 2.

Figure 7:
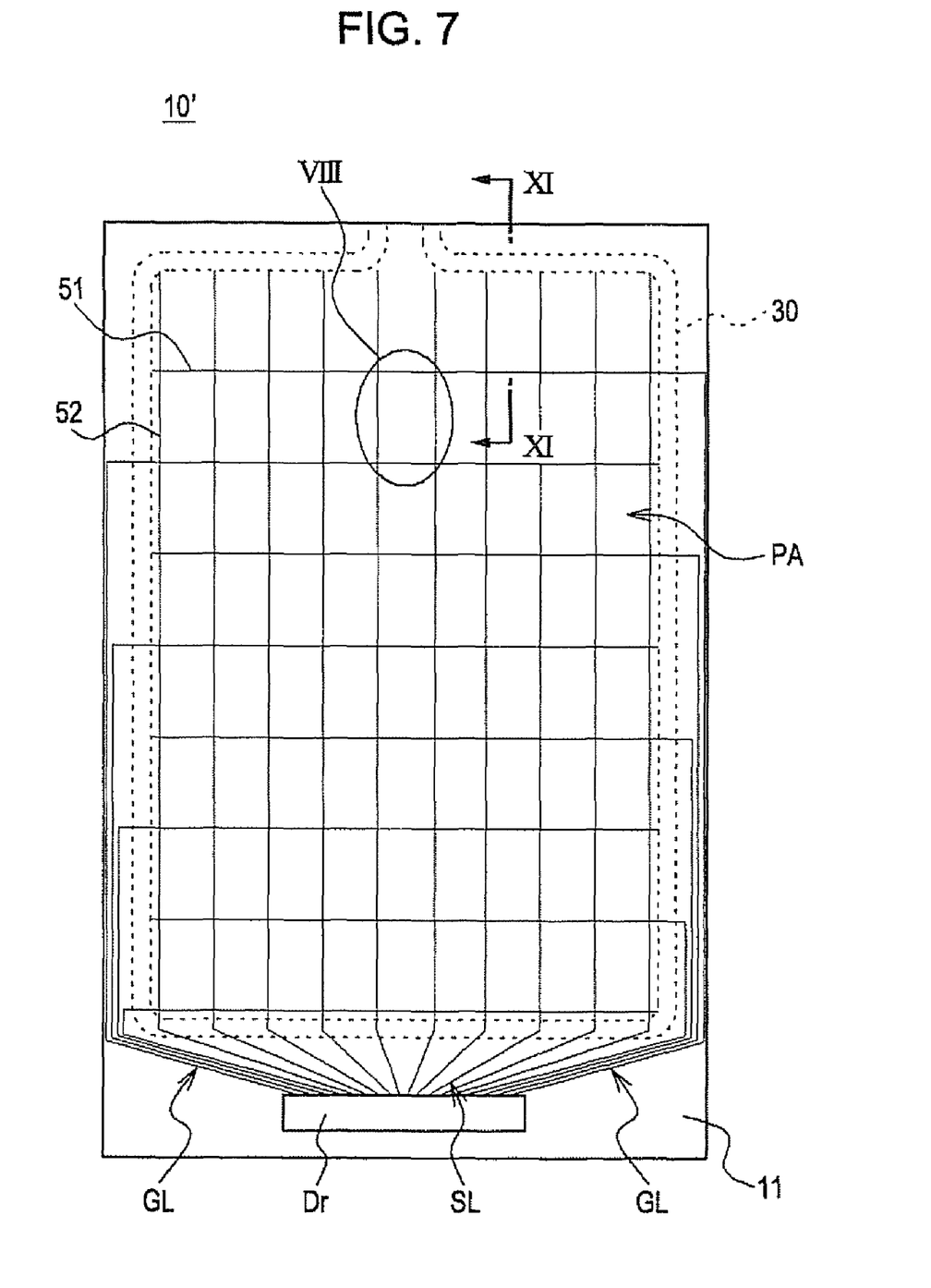
FIG. 7 is a plan view schematically showing a state of a surface of an array substrate of a liquid crystal display panel according to a second embodiment.
Figure 8:
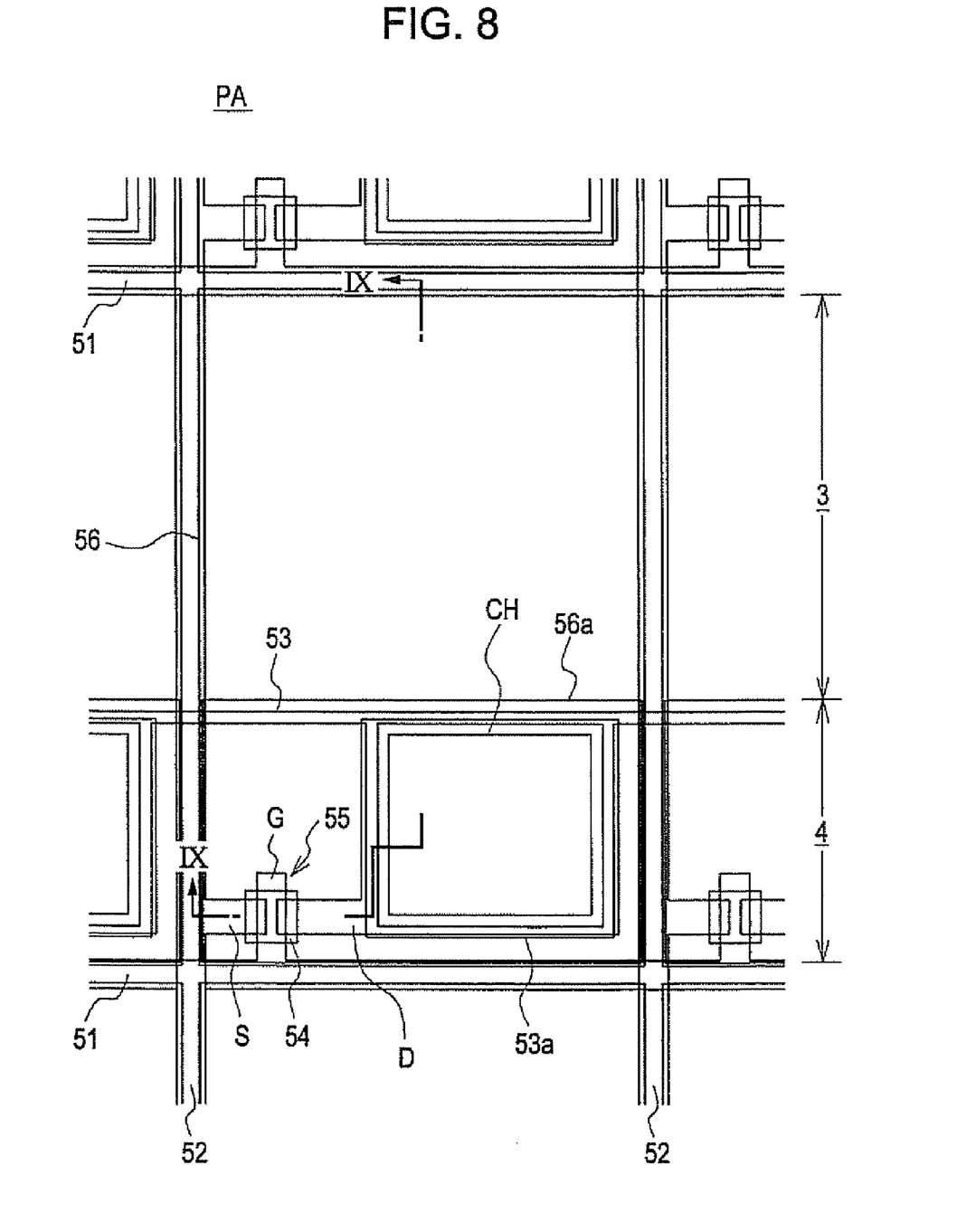
FIG. 8 is an enlarged plan view showing the portion VIII of FIG. 7 for illustrating a wiring structure in one pixel area.
Figure 9:
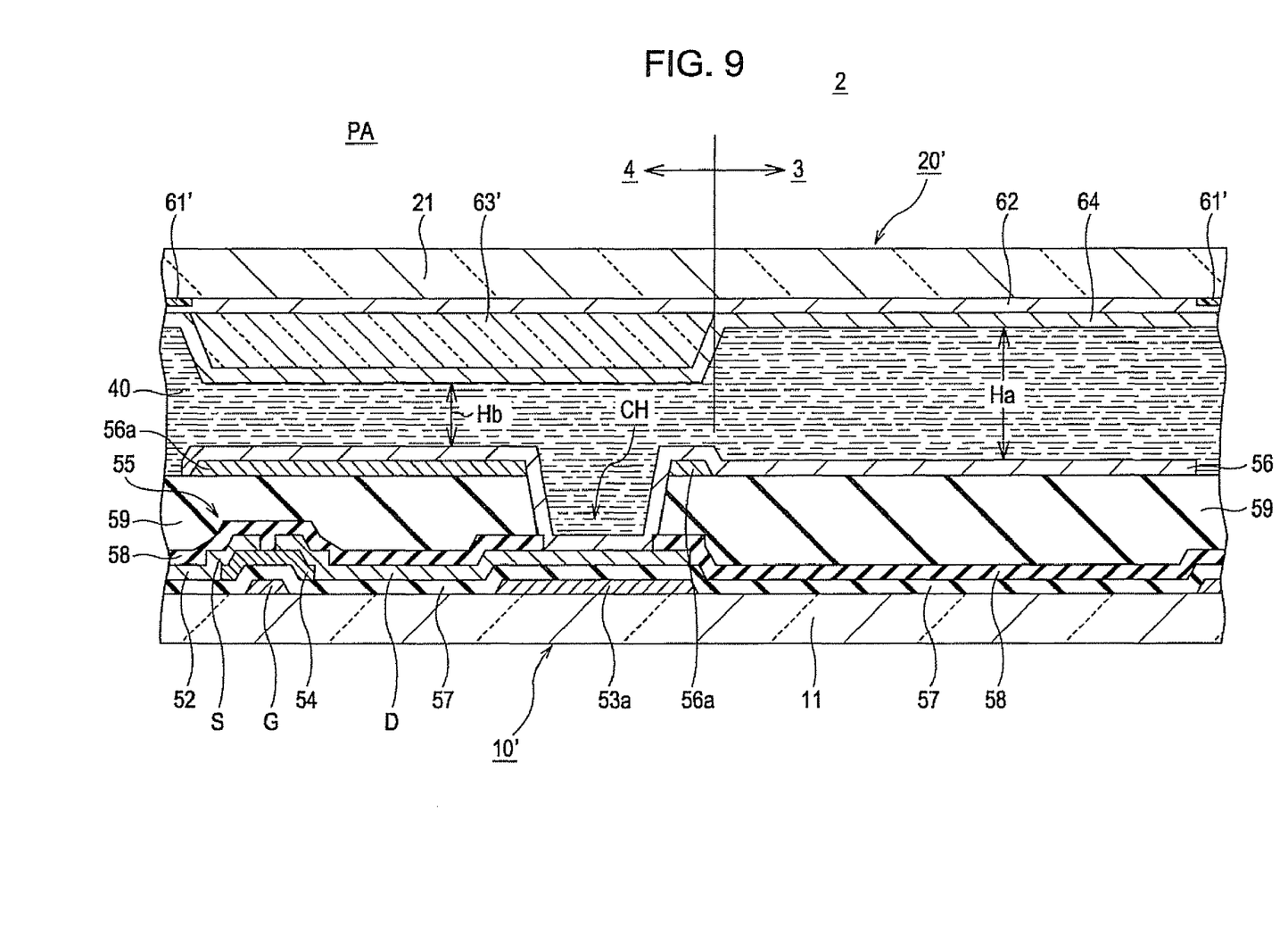
FIG. 9 is a main part cross sectional view taken long the line IX-IX of FIG. 8.
Figure 10:
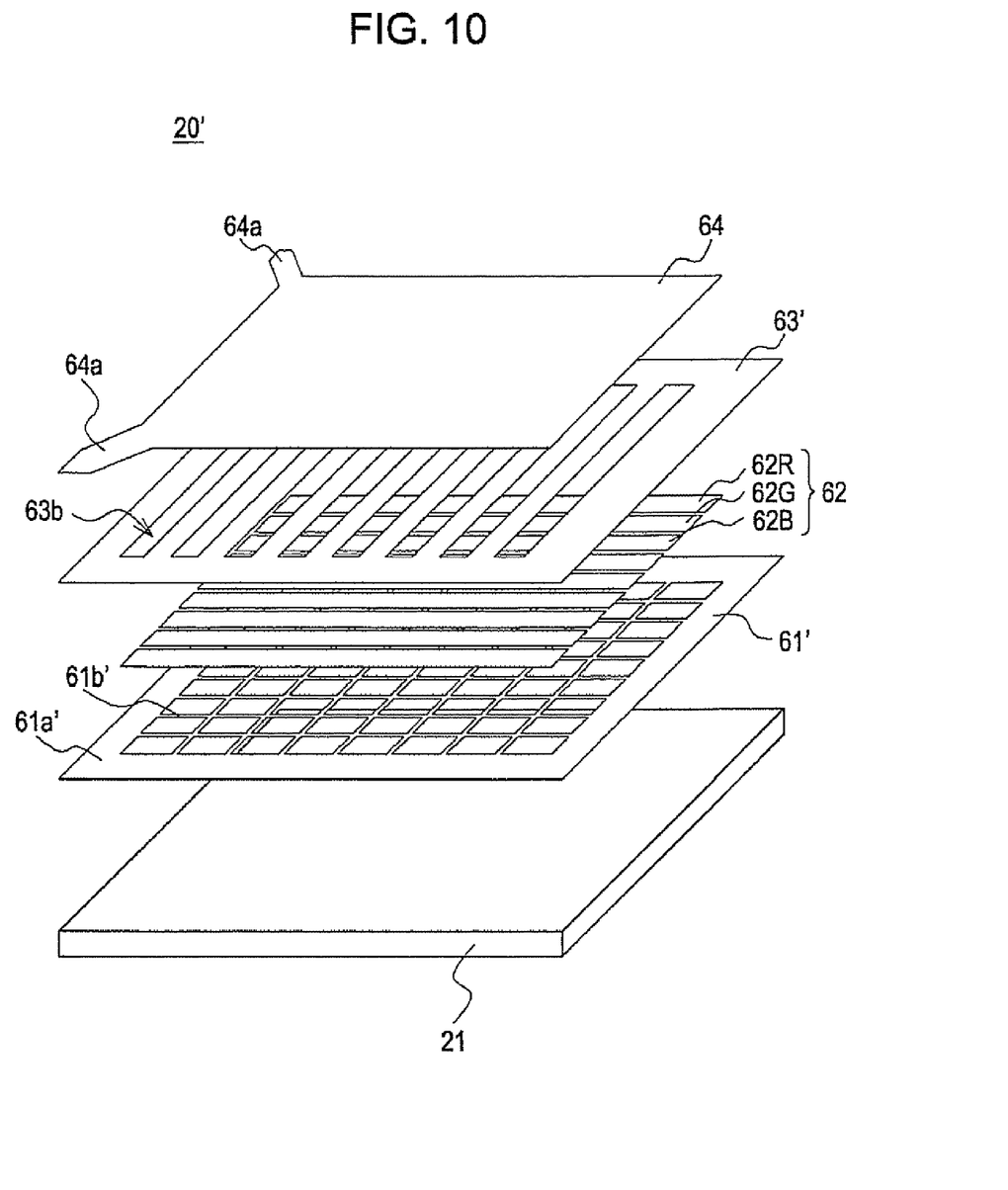
FIG. 10 is an exploded perspective view schematically showing a color filter substrate of the liquid crystal display panel according to the second embodiment.
Figure 11:
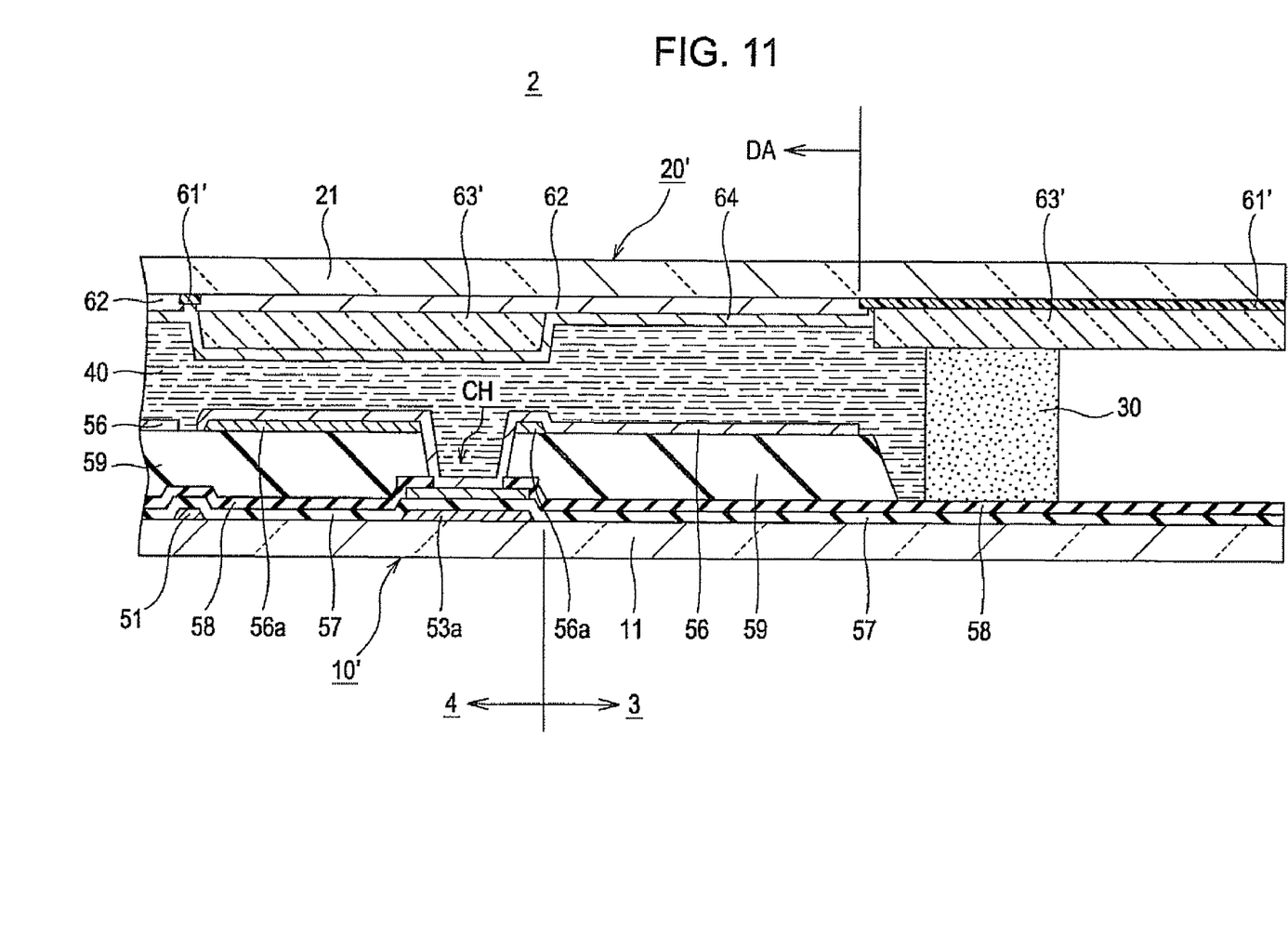
FIG. 11 is a main part cross sectional view taken along the line XI-XI of FIG. 7.

FIG. 7 is a schematic plan view showing a state of a surface of an ally substrate of a liquid crystal display panel according to the second embodiment. FIG. 8 is an enlarged plan view showing the portion VIII of FIG. 7 for illustrating a wiring structure in one pixel area. FIG. 9 is a main part cross sectional view taken along the line IX-IX of FIG. 8. FIG. 10 is an exploded perspective view schematically showing a color filter substrate of the liquid crystal display panel according to the second embodiment. FIG. 11 is a main part cross sectional view taken along the line XI-XI of FIG. 7.

Note that the liquid crystal display panel 2 of the second embodiment is substantially equipped with the same structure as the liquid crystal display panel 1 of the first embodiment except that the liquid crystal display panel 2 is a semi transmissive type. Accordingly, a structure of the liquid crystal display panel 2 different from that of the liquid crystal display panel 1 of the first embodiment will be described in detail. The same reference numeral is used to denote the same element end description thereof will be omitted.

Further, the appearance shape of the liquid crystal display panel 2 according to the second embodiment is the same as the liquid crystal display panel 1 according to the first embodiment as shown in FIG. 1. A different point between the array substrate 10' of the liquid crystal display panel 2 and the liquid crystal display panel 1 in the structure is that a reflection plate 56a is formed between the pixel electrode 56 and the interlayer film 59 in a reflective portion 4 (see FIG. 9). The reflection plate 56a is made of, for example, an aluminum metal or an aluminum alloy. The reflection plate 56a is provided to perform a display by efficiently reflecting outside light. The auxiliary capacity electrode 53a formed by a light shielding metal is provided below the reflection plate 56a. In addition, the TFT 55 is also provided. By covering the surface of the TFT 55 with the reflection plate 56a in this manner, the reflection plate 56a is also equipped with a function to shield the semiconductor layer 54 from outside light.

As shown in FIG. 10, at least a resin light shielding layer 61' formed to match the pixel area PA (see FIG. 8) of the allay substrate 10', color filter layers 62 (62R, 62G, 62B) provided in the area surrounded by the resin light shielding layer 61, a protection film 63' provided to cover a part of the light shielding layer 61', and the common electrode 64 provided to cover the color filter layer 62 are provided on the glass substrate 21 in the color filter substrate 20' of the liquid crystal display panel 2.

Among the layers, the resin light shielding layer 61' is constituted by a frame portion 61a' that covers the entire outer circumference of the outside of the display area DA, and a grid portion 61b' positioned inside the frame portion 61a', that is, positioned in the display area DA and formed in a grid manner to oppose the scanning lines 51 and the signal lines 52 of the array substrate 10'. Note that the resin light shielding layer 61' does not cover the TFT 55. With the structure, the aperture of the reflective portion 4 can be increased to improve luminance in the reflective portion 4.

Further, the protection film 63' is formed by a material having high adhesiveness with the seal material 30. Then, the protection layer 63' is provided right below the common electrode 64. The protection film 63' covers the frame portion 61a' of the resin light shielding layer 61' and also provided at the position opposing the reflective portion 4 of the pixel area PA. That is, the protection film 63' has a plurality of aligned slits 63b each of which is continuously opened so as to correspond to the transmissive portions 3 of the adjacent pixel areas PA. Note that the aligned slits 63b are not necessary to be opened over the entire display area DA. For example, the opening of the transmissive portions 3 may be continued in one of the adjacent three pixel areas PA. Further, in the second embodiment shown in FIG. 10, the protection film 63' in the reflective portion 4 is continued over the entire display area DA. Note that the protection film 63' in the reflective portion 4 may have a cutout between adjacent pixel areas PA. Further, in one of the adjacent three pixel areas PA in the reflective portion 4, the protection film 63' may be continued, and a cutout may be provided in the protection film 63' in the reflective portion 4 between the three pixel areas PA and the adjacent pixel area PA. By providing the cutout between the adjacent pixel areas PA in the protection film 63' in the reflective portion 4, the occurrence of the problem, for example, an alignment layer is accumulated at a particular opening in the transmissive portion 3 when applying the alignment layer can be reduced.

In addition, it is preferable that the thickness of the protection film 63' is appropriately set to match a cell gap of the liquid crystal display panel 2. That is, as shown in FIG. 9, the distance Ha between the both substrates 10', 20' in the transmissive portion 3 and the distance Hb between the both substrates 10', 20' in the reflective portion 4 are set to satisfy the relation shown in (formula 1) described below.

$$Hb = \tfrac{1}{2} Ha \qquad \text{(formula 1)}$$

By setting the thickness of the protection film 63' as described above, it becomes possible to use the protection film 63' also as a transparent film for adjusting a cell gap provided in a normal semi transmissive liquid crystal display panel. Accordingly, the protection film 63' having a portion corresponding to the conventional transparent film for adjusting a cell gap can be formed without specifically increasing the number of a series of manufacturing processes of the liquid crystal display panel. Further, a difference of color tone is almost disappeared between the transmissive portion 3 and the reflective portion 4 by forming the protection film 63', so that the semi transmissive liquid crystal display panel 2 that provides a good display quality can be obtained.

In the liquid crystal display panel 2 having the aforementioned structure, the seal material 30 is provided to surround the outer circumference of the display area DA as shown in FIG. 11 similarly to the liquid crystal display panel 1 of the aforementioned first embodiment. Then, the seal material 30 is bonded with the passivation film 58 at an end of the array substrate 10' side, and bonded with the protection film 63' at an end of the color filter substrate 20' side. Since the end of the seal material 30 at the color filter substrate 20' side and the protection film 63' are bonded in this manner, the protection film 63' having high adhesiveness as compared with the resin light shielding layer 61' and the seal material 30 are strongly bonded. Accordingly, occurrence of separation phenomenon at the portion can be prevented. Further, the silt 63b is formed at the position opposing the transmissive portion 3 in the protection film 631, so that transmittance ratio in the transmissive portion 3 is not lowered.

Further, the amount of the seal material 30 to be used can be reduced as compared with the conventional semi transmissive liquid crystal display panel described in the "summary". That is, the number of the films to be formed is reduced by one layer as compared with the case in which the protection film and the transparent film for adjusting a cell gap are formed in the reflective portion as in the past. Accordingly, the distance between the array substrate 10' and the color filter substrate 20' is closed if the cell gap is equal and the amount of the seal material 30 can be reduced for the distance. Further, although omitted in the drawings, it is preferable that the position at which the columnar spacer that is generally known as means for regulating the cell gap is formed is in the reflective portion 4 in which the protection film 63, exists rather than in the transmissive portion 3. This is because that the surface in the transmissive portion 3 is not so flat due to the thick resin light shielding layer 61' but the surface in the reflective portion 4 is flat due to existence of the protection film 63' with the resin light shielding layer 61'. Further, when the columnar spacer is formed on the protection film 63', the stability of the columnar spacer is increased as compared with the case in which the columnar spacer is formed on two layers constituted from the protection film and the transparent film for adjusting a cell gap as in the past.

Each of the liquid crystal display panels 1, 2 described in the aforementioned embodiments 1, 2 is a vertical direction electric field mode (for example, a TN (Twisted Nematic) type or a VA (Vertical Alignment) type) in which the common electrode 64 is equipped in the color filter substrates 20, 20'. However, the liquid crystal display panel is not limited to the vertical direction electric field mode, and a horizontal direction electric field mode (for example, an IPS (In-Plane Switching) type or an FFS (Fringe Field Switching) type) may be also applied.

Figure 12A:
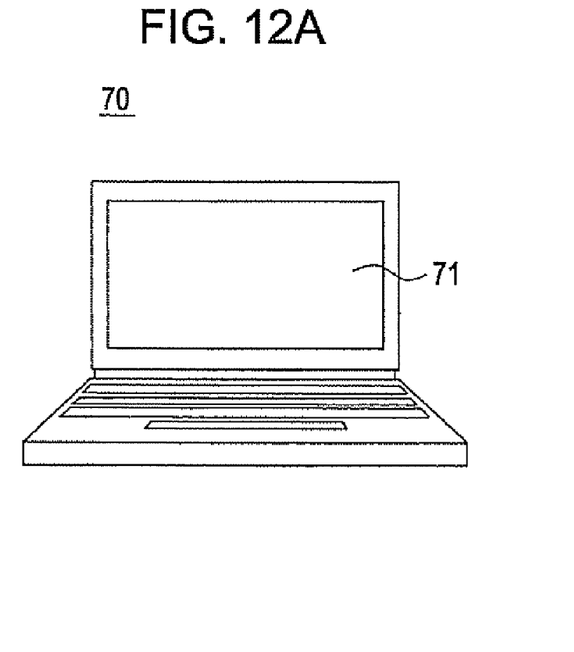
Figure 12B:
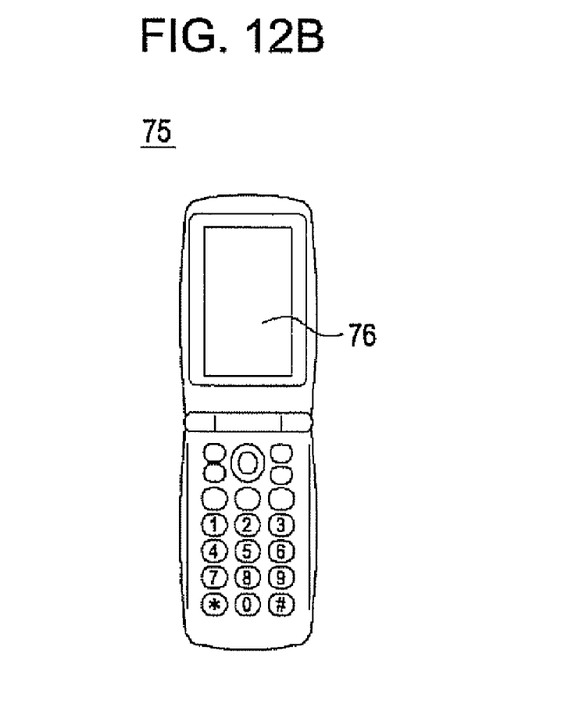
FIG. 12B is a diagram showing a cellular phone in which the liquid crystal display panel is mounted.

As described above, the liquid crystal display panels 1, 2 are described as the first and second embodiments. The liquid crystal display panels 1, 2 can be used for an electronic apparatus such as a personal computer, a cellular phone, a personal digital assistance, or the like. An example in which a display unit 71 is used for a personal computer 70 is shown in FIG. 12A, and an example in which a display unit 76 is used for a cellular phone 75 is shown in FIG. 12B. However, the detailed description will be omitted as the basic structures of the personal computer 70 and the cellular phone 75 are well known for a person skilled in the art.

What is claimed is:

1. A liquid crystal display panel comprising:
   an array substrate having at least a pixel electrode and a switching element for every pixel area in a display area on a transparent substrate;
   a color filter substrate in which a light shielding layer made of a resin is formed on a transparent substrate at least outside the display area and a color filter layer is formed to oppose the pixel electrode;
   a common electrode that covers the light shielding layer at the border between the display area and the light shielding layer; and
   liquid crystal enclosed between the array substrate and the color filter substrate that are bonded by a seal material, wherein a protection film having an opening, the opening being opened in the display area, is formed on the color filter substrate in the outside of the display area to cover at least the portion of the light shielding layer on which the seal material is formed; and wherein the protection film covers only a frame portion of the light shielding layer, the frame portion corresponding to an area where the light shielding layer does not overlap the display area.

2. The liquid crystal display panel according to claim 1, wherein the protection film is formed to surround the display area.

3. The liquid crystal display panel according to claim 1, wherein the pixel area has a transmissive portion and a reflective portion, and the protection film is a transparent resin and the opening is formed at a position corresponding to the transmissive portion.

4. The liquid crystal display panel according to claim 3, wherein the opening is formed to stride across the adjacent transmissive portions.

5. The liquid crystal display panel according to claim 3, wherein if a distance between a surface of the array substrate and a surface of the color filter substrate in the transmissive portion is Ha, and if a distance between a surface of the array substrate and a surface of the color filter substrate in the reflective portion is Hb, a thickness of the protection film is set to satisfy a relation described below: $Hb=\frac{1}{2}Ha$.

6. An electronic apparatus comprising the liquid crystal display panel according to claim 1.

7. The liquid crystal display panel according to claim 1, wherein the seal material is bonded to the array substrate through a passivation film.

8. A method for manufacturing a liquid crystal display panel that includes an array substrate in which a pixel electrode and a switching element are formed for every pixel area in a display area on a transparent substrate, and a color filter substrate in which a light shielding layer made of a resin is formed on a transparent substrate and a color filter layer is formed to oppose the pixel electrode, and in which the array substrate and the color filter substrate are bonded together by a seal material and liquid crystal is enclosed between the array substrate and the color filter substrate, the method for manufacturing a liquid crystal display panel comprising:

forming the light shielding layer made of a resin on the color filter substrate to separate the pixel area;

forming the color filter layer on the color filter substrate for every the pixel area; forming a common electrode layer that covers the light shielding layer at the border between the display area and the light shielding layer;

forming a protection film, the portion of the protection film corresponding to the display area being opened, on the color filter substrate on which the light shielding layer made of a resin and the color filter layer are formed; and applying the seal material outside the display area and bonding the array substrate and the color filter substrate together; and wherein the protection film covers only a frame portion of the light shielding layer, the frame portion corresponding to an area where the light shielding layer does not overlap the display area.

9. The method for manufacturing a liquid crystal display panel according to claim 8, wherein the pixel area has a transmissive area and a reflective area, the protection film is made of a transparent resin, and when forming the protection film, the protection film is formed so that a portion correspond to the transmissive portion is opened, and if a distance between a surface of the array substrate and a surface of the color filter substrate in the transmissive portion is Ha and if a distance between a surface of the array substrate and a surface of the color filter substrate in the reflective portion is Hb, a thickness of the protection film is set to satisfy a relation described below: $Hb=\frac{1}{2}Ha$.

10. The method for manufacturing a liquid crystal display panel according to claim 8, wherein in bonding the array substrate and the color filter substrate together, the seal material is bonded to a passivation film at the end of the array substrate side.

* * * * *